(12) United States Patent
Hsieh

(10) Patent No.: US 8,662,703 B2
(45) Date of Patent: Mar. 4, 2014

(54) LENS STRUCTURE FOR MOBILE PHONE FLASHLIGHT

(71) Applicant: Lion Optics Co., Ltd., Miaoli (TW)

(72) Inventor: Hung-Yu Hsieh, Miaoli (TW)

(73) Assignee: Lion Optics Co., Ltd., Miaoli (TW)

( * ) Notice: Subject to any disclaimer, the term of this patent is extended or adjusted under 35 U.S.C. 154(b) by 0 days.

(21) Appl. No.: 13/684,194

(22) Filed: Nov. 22, 2012

(65) Prior Publication Data

US 2013/0155691 A1    Jun. 20, 2013

(30) Foreign Application Priority Data

Dec. 15, 2011    (TW) .............................. 100146606 A

(51) Int. Cl.
*F21V 1/00*    (2006.01)
(52) U.S. Cl.
USPC ................. 362/235; 362/311.01; 362/311.06; 359/457; 359/742

(58) Field of Classification Search
USPC ......... 362/235, 311.01, 311.06; 359/457, 742
See application file for complete search history.

(56) References Cited

U.S. PATENT DOCUMENTS

| 7,922,369 B2 * | 4/2011 | Condon et al. ........... 362/311.01 |
| 2012/0075866 A1 * | 3/2012 | Chang ..................... 362/296.01 |
| 2012/0243110 A1 * | 9/2012 | Robinson .................... 359/742 |

* cited by examiner

*Primary Examiner* — Evan Dzierzynski

(57) ABSTRACT

A lens structure for mobile phone flashlight is provided, to improve luminance of edge area and overall luminance. The lens structure includes a lens body. The lens body includes an incident surface and a light-emitting surface, and the incident surface is a Fresnel lens. Edge area of the light-emitting surface is partially disposed symmetrically with at least a pair of second surfaces, and remaining area forms a first surface. The edges of the second surfaces tilt towards direction of the incident surface so that the first surface forms an angle with the second surfaces. As such, the lens structure is able to refract light to project in near rectangular area onto a target object when taking picture.

9 Claims, 5 Drawing Sheets

LENS STRUCTURE FOR MOBILE PHONE FLASHLIGHT

FIELD OF THE INVENTION

The present invention generally relates to smart phone technique, and more specifically to a lens structure for mobile phone flashlight.

BACKGROUND OF THE INVENTION

FIG. 6 shows a schematic view of composition of lens structure and light source in a convention smart phone. A flashlight lens 61 of a conventional smart phone is Fresnel lens, with LED as light source 62. Fresnel lens has the capability of guiding light and collecting light, as well as thin, light, able to plasticized and low cost; therefore, the Fresnel lens is often used in flashlight. The shape of Fresnel lens is circular, flat and thin, with one surface acting as incident side 611 being ring-shaped jagged surface and the other surface being a flat light-emitting surface 612. When used with light source 62, jagged incident surface 611 faces the light source 62. The light source 62 can be a single LED or a plurality of LED arranged as an array.

When LED light source 62 emits light, the light is reflected by circular lens 61 and the luminance will be redistributed and projected onto the surface of the photography target object. The projected area is shaped as circular. The ideal situation is the circular area show uniform luminance theoretically. However, the actual distribution usually appears that the luminance in outer area is usually lower than the inner area. An alternative is to waste some light to non-effective outer area to obtain a more uniform light distribution. Also, as the captured image of the mobile phone usually has a rectangular effective area, the luminance in the area between the circular projected area and the rectangular area usually cannot be sensed by the light-sensing element.

Therefore, the it is desirable to devise a lens structure able to refract inwards the light of the outer are of circular projected area to address the above drawbacks of the conventional technique.

SUMMARY OF THE INVENTION

The primary object of the present invention is to provide a lens structure able to project the light onto a rectangular area to match the rectangular area covered by the light sensing elements in camera.

Another object of the present invention is to provide a lens structure able to improve luminance in the outer area of the projected area so that the luminance of projected area shows high uniformity for the light sensing elements in the camera to achieve optimal result.

To achieve the above objects, the present invention provides a lens structure able to project the light onto a rectangular area. The lens structure of the present invention includes a lens body, the lens body including an incident surface and a light-emitting surface. The incident surface and the light-emitting are opposite to each other. The incident surface is a Fresnel lens. The edge of the light-emitting surface partially forms at least a pair of second surfaces disposed symmetrically, and the remaining area forms a first surface. The edge of the second surfaces tilts towards the direction of the incident surface so that the first surface and the second surface form an angle.

The operating theory of the above structure is that when the flashlight emits light, the light passes the incident surface and is refracted by the ring-shaped ragged surface to penetrate the lens body. The light then emits from the light-emitting surface to form a near rectangular projected area. The light along the path through the first surface is unchanged to form a near rectangular projected area and the light along the path through the second surface will be refracted towards the projected area originally of the light emitting from the first surface. The function of the second surface is to increase the luminance close to the boundary area of the projected area so that the rectangular light sensing element has better effect when the camera takes a picture.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
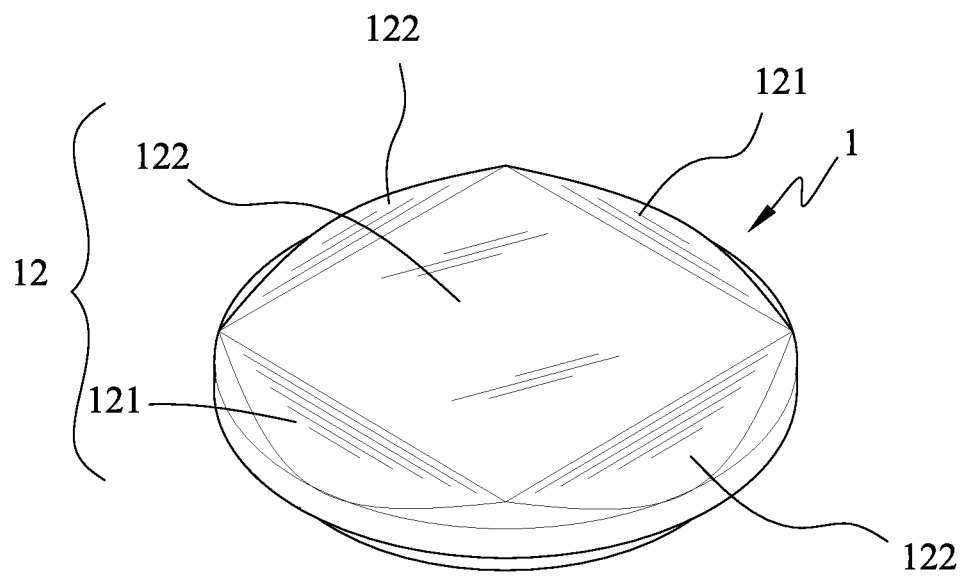
FIG. 1 shows a schematic view of the present invention.
Figure 2:
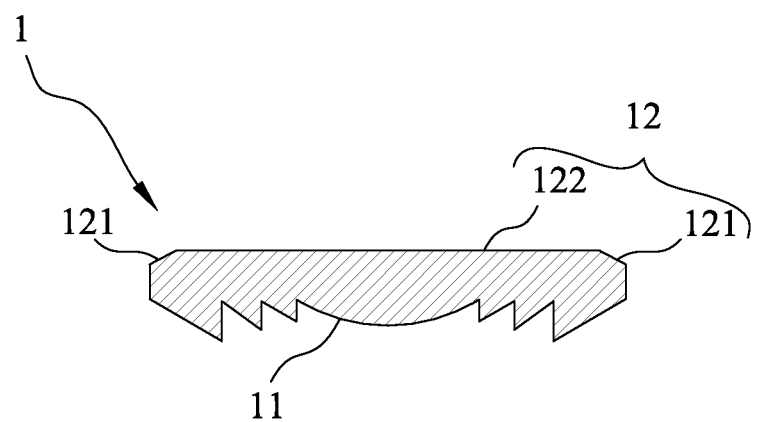
FIG. 2 shows a cross-sectional view of the present invention.

FIG. 1 and FIG. 2 show a schematic view and a side view of a preferred embodiment of the lens structure of mobile phone flashlight according to the present invention respectively. The lens structure includes a lens body 1. The lens body has a thin body. When the lens body is used as the lens of mobile phone flashlight, the circumference of the lens body is usually cylindered. The two opposite surfaces of the lens body 1 include an incident surface 11 and a light-emitting surface 12. When installed, incident surface 11 faces light source of the flashlight (described later). In the present invention, incident surface 11 is a Fresnel lens because Fresnel lens uses less material and is light in weight and small in size compared to conventional lens. Also, the Fresnel lens is thin and able to transmit more light. To achieve better light sensing result for rectangular light sensing elements, such as, CCD or CMOS inside the camera, the edge area of light-emitting surface 12 of the present invention is partially disposed symmetrically with at least a pair of second surfaces 121, and the remaining area forms a first surface 122. The closer the second surfaces 121 is to the edge, the more the second surfaces tilt towards the direction of incident surface 11. There is at least a pair of second surfaces 121. Under the light source, the projected area forms a near rectangle. In a preferred embodiment, as shown in FIG. 1, two pairs of second surfaces 121 are disposed in an equi-angle manner. At this point, the bordering lines between the first surface 122 and two pairs of second surfaces 121 form a near rectangular shape. Hence, the projected area is also near rectangular. But the present invention is not limited to the above embodiment. For example, the bordering line between the first surface 122 and two pairs of second surfaces 121 can also be arcs bending inwards or outwards.

Figure 3:
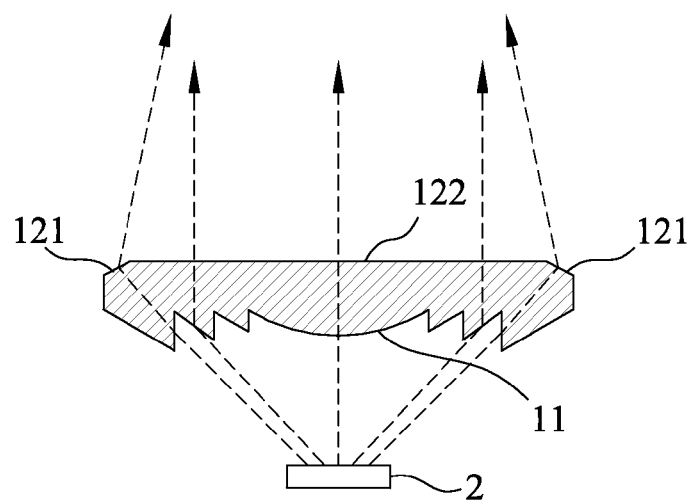
FIG. 3 shows a schematic view of light refraction of the present invention.

FIG. 3 shows a schematic view of the refracted light path of the light source through the lens structure of the present invention. When light source 2 emits light, the light radiates outwards. After refracted by incident surface 11 of Fresnel lens, the light is collected and redistributed to travel inside lens body 1. Then, the light emitted from first surface 122 travels and projects straight ahead, and the light emitted from second surfaces 121 is refracted inwards. The refracted light is to compensate the luminance in the boundary area of the projected area.

Figure 4A:
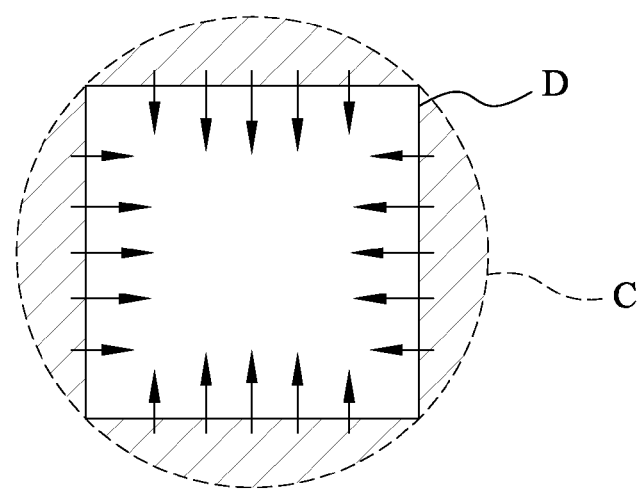
FIGS. 4A-4C show difference of the projected area shapes formed by the light travelling through the lens structure of the present invention and conventional lens structure.
Figure 4B:
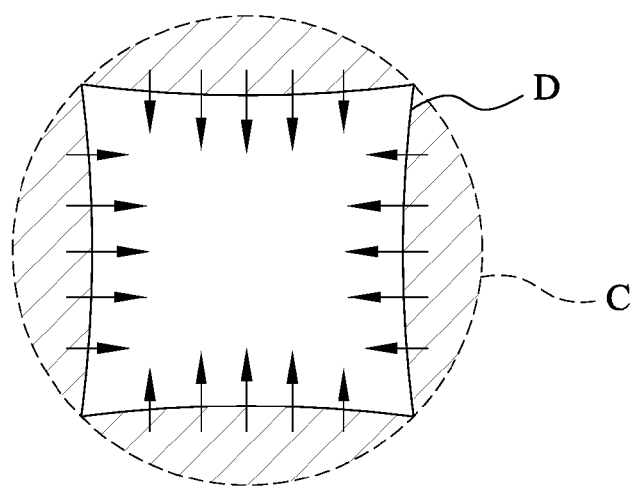
Figure 4C:
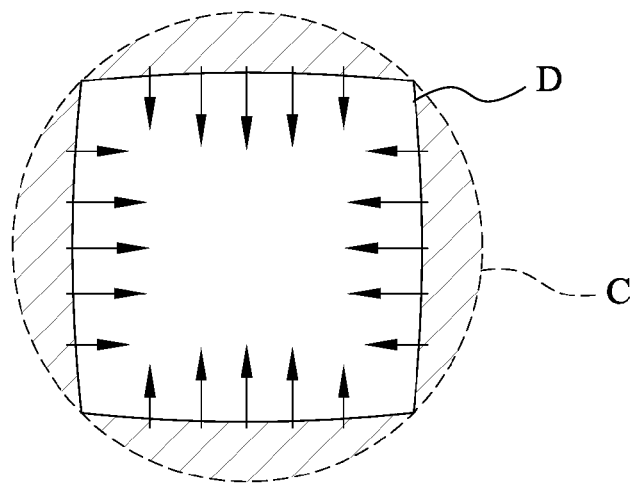

FIGS. 4A-4C show difference of the projected area shapes formed by the light travelling through the lens structure of the present invention and conventional lens structure. When the flashlight mode is selected and the picture is taken by the camera, the lens will project light onto the target object in rectangular shape D. As shown in FIG. 4B and FIG. 4C, the edges of the rectangular area of the present invention is not restricted to straight lines, and can also be arcs bending inwards or outwards. Compared to circular projected area C formed by conventional lens, the present invention refracts the light originally projected onto the area between C and D inwards to become projected onto the area boundary area of the projected area to enhance the luminance of the boundary area so that the luminance of the entire projected area is more uniform. As such, the light sensing elements CCD or CMOS inside the camera can achieve better light sensing effect.

Figure 5A:
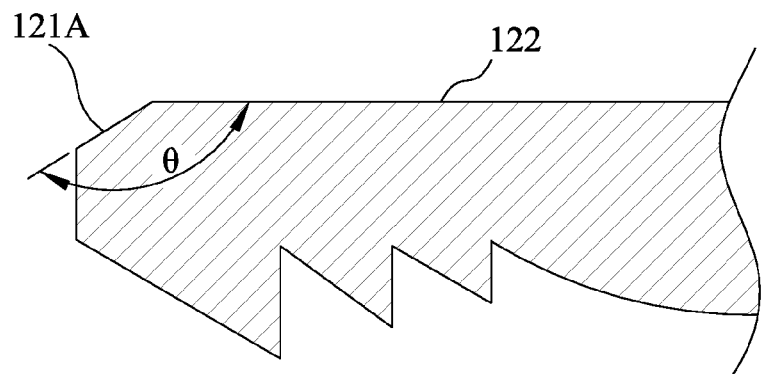
FIG. 5A shows a schematic view of the first embodiment of the second surface according to the present invention.
Figure 5B:
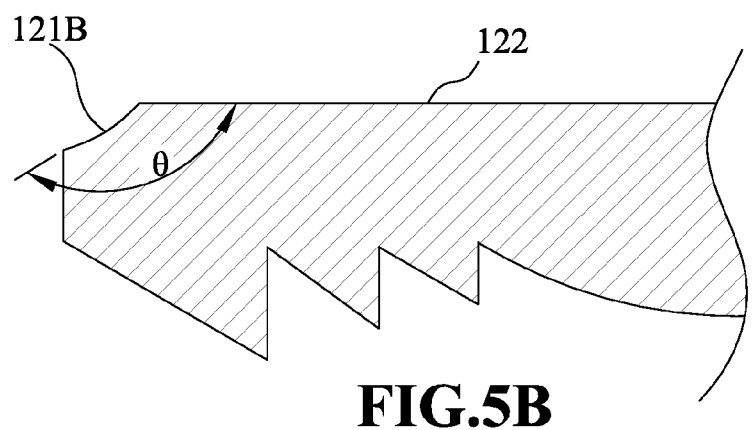
FIG. 5B shows a schematic view of the second embodiment of the second surface according to the present invention.
Figure 5C:
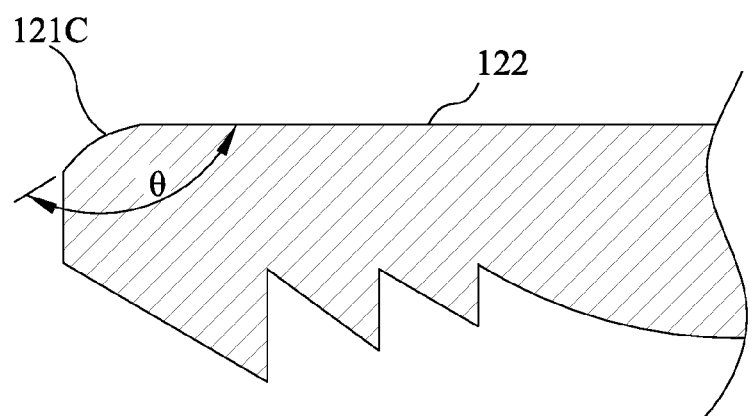
FIG. 5C shows a schematic view of the third embodiment of the second surface according to the present invention.
Figure 6:
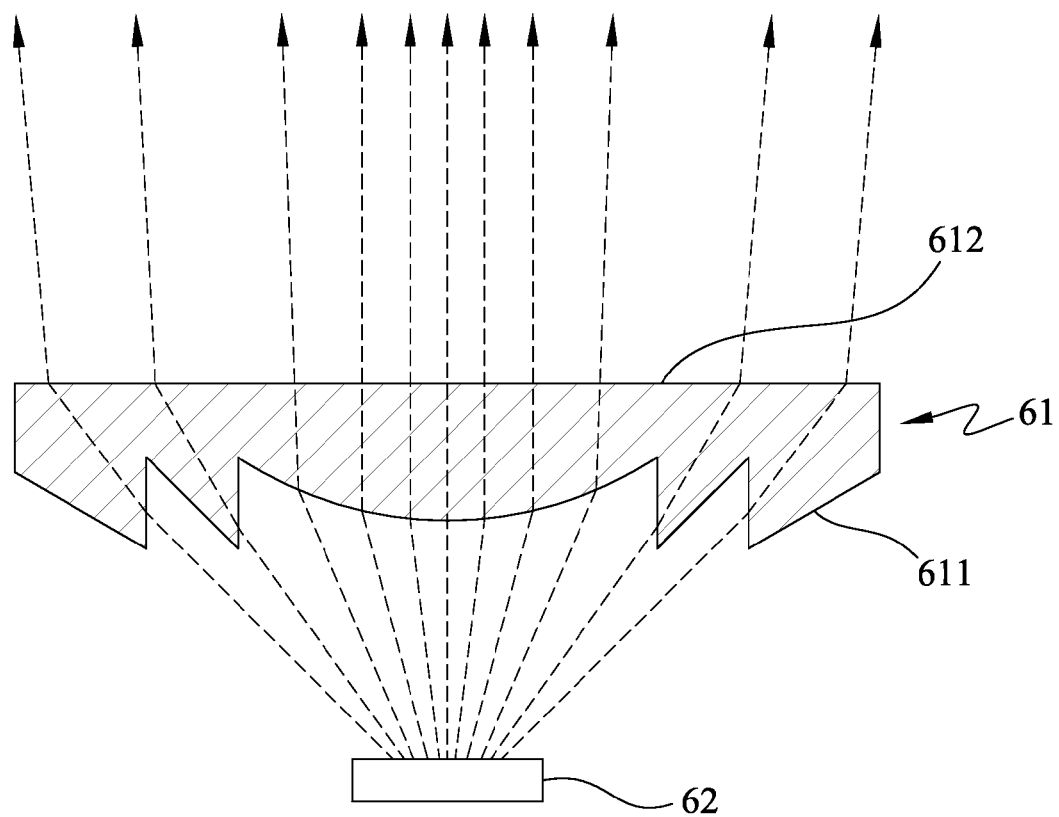
FIG. 6 shows a schematic view of composition of lens structure and light source in a convention smart phone.

FIGS. 5A-5C show schematic views of three different second surfaces. As aforementioned, the closer the second surfaces 121 is to the edge, the more the second surfaces tilt towards the direction of incident surface 11. The second surfaces can also be slanted second surfaces 121A shown in FIG. 5A, concave second surfaces 121B shown in FIG. 5B, or convex second surfaces 121C shown in FIG. 5C. Second surfaces 121A, 121B and 121C all share the same objective to refract light towards center area of the lens when light travels through the second surfaces. Therefore, regardless of concave or convex, the curvature is small to avoid affecting the refraction effectiveness. Therefore, the second surfaces of the present invention is not restricted to any specific shape as long as the second surface can refract light towards center area of the lens.

Second surfaces 121A, 121B, 121C forms an angle θ with first surface 122. Taking the contact point between the second surface and the first surface as the starting point and the edge of the second surface farthest from the contact point as the ending point, the line connecting the starting point and the ending point forms the angle θ with first surface 122. When $130°<\theta<178°$, the projected area is closest to a rectangle, and thus providing the optimal result regarding luminance and uniformity for the light sensing elements.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lens structure for mobile phone flashlight, comprising a lens body, said lens body comprising an incident surface and a light-emitting surface, said incident surface being a Fresnel lens, characterized in that:
    edge area of said light-emitting surface being partially disposed symmetrically with at least a pair of second surfaces, and remaining area forming a first surface; edge of said second surfaces tilting towards direction of said incident surface so that said first surface forming an angle with said second surfaces.

2. The lens structure as claimed in claim 1, wherein said angle ranges between 130° and 178°.

3. The lens structure as claimed in claim 1, wherein said second surface is one of slant surface and curvy surface.

4. The lens structure as claimed in claim 1, wherein said second surface comprises at least a slant surface and a curvy surface.

5. The lens structure as claimed in claim 1, wherein said second surface comprises at least two curvy surfaces of different curvatures.

6. The lens structure as claimed in claim 1, wherein two pairs of said second surfaces are disposed symmetrically.

7. The lens structure as claimed in claim 6, wherein edge of said light-emitting surface comprises four said second surface disposed in equi-angle manner.

8. The lens structure as claimed in claim 6, wherein bordering lines between said first surface and said second surfaces form a rectangle.

9. The lens structure as claimed in claim 1, wherein when said lens is used with a light source, light emitting from said second surface is refracted to focus onto a projected area formed by light emitting from said first surface.

* * * * *